Sept. 12, 1933.  W. A. WALLMAN  1,926,759
SEWER TRAP
Filed Oct. 29, 1932
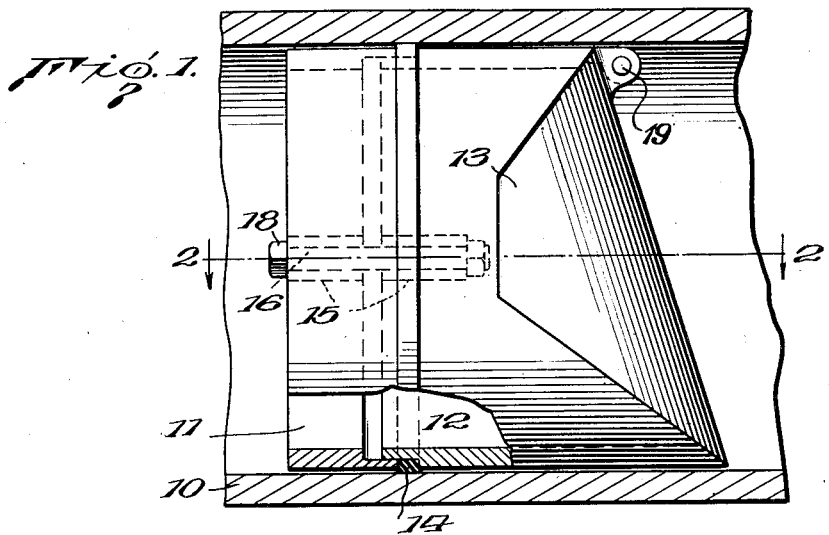
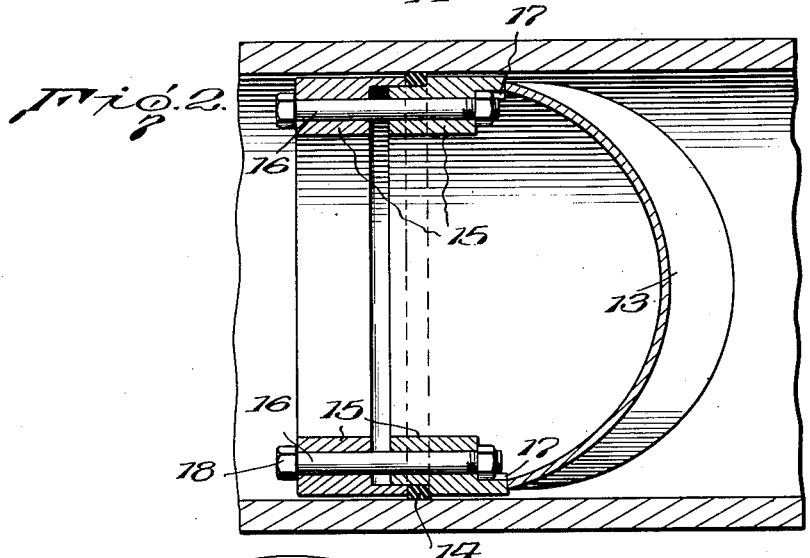
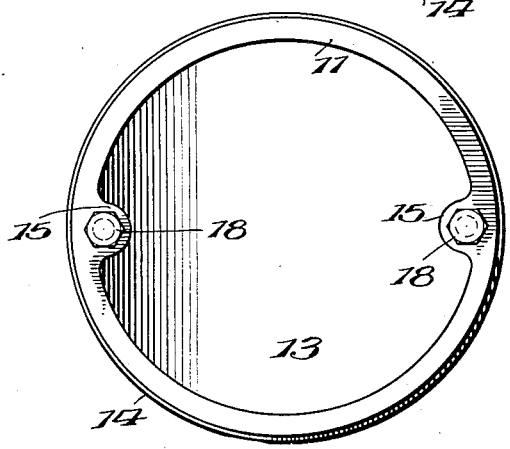
Inventor
Walter A. Wallman
By Church & Church
His Attorneys Patented Sept. 12, 1933

1,926,759

UNITED STATES PATENT OFFICE 1,926,759

SEWER TRAP

Walter A. Wallman, Astoria, Oreg.

Application October 29, 1932. Serial No. 640,293

4 Claims. (Cl. 182—26)

This invention relates to traps for pipes and particularly to a gas trap for sewer pipes.

It is not infrequent that objectionable gases escape from pipes, especially sewer pipes, and the primary object of the present invention is to provide means, in the form of a trap, which will retain such gas in the pipe.

Another object of the invention is to provide a trap which can be readily placed in a previously installed pipe and an effective seal between the trap and pipe formed without destroying any portion of the pipe or the system, of which it forms a part.

More specifically, the invention contemplates a trap composed of two telescopic sections of any desired cross-sectional contour and a resilient gasket that can be expanded into sealing contact with the pipe by a relative movement of said sections.

With these and other objects in view, the invention consists in certain details of construction and combinations and arrangements of parts, all as will be hereinafter more fully described and the novel features thereof particularly pointed out in the appended claims.

In the accompanying drawing,

Figure 1 is a sectional view, taken longitudinally of a pipe with the present trap installed therein;

Fig. 2 is a horizontal section on the line 2—2 of Fig. 1;

Fig. 3 is an end elevation of the trap looking into the trap from the open end thereof.

The pipe to be sealed is indicated at 10, with the trap installed therein. Said trap comprises two relatively movable sections 11, 12, one of which carries a pivoted valve 13 whereby contents of the pipe may flow in one direction only. In the present structure the valve is hinged at 19 to trap section 12 and formed with angular side edges. However, the contour of the valve is immaterial except it should form a tight fit with section 12. If desired, a gasket (not shown) can be placed on the valve.

The two trap sections are adapted to telescope within one another to a limited extent, section 11 being adapted to receive the contiguous end of section 12 in the present instance and interposed between the two sections is an expansible element in the form of rubber gasket 14.

On the interior of each section there are a plurality of perforated lugs 15, the perforations in the lugs of the two sections being alined to receive bolts 16. The end of each bolt, projecting beyond the lugs of section 12, are threaded to receive nuts, and said nuts are held against turning by shoulders 17 formed by recesses in the interior surface of section 12. By turning the bolts with a suitable implement applied to the bolt heads 18, it is apparent that the two sections can be moved toward each other and that such movement will expand the rubber gasket 14.

The installation of the trap in the pipe will be readily understood. Suffice it to say, that with the sections 11, 12 separated to permit contraction of gasket 14, the trap is slipped into the pipe and, when properly located, the sections drawn together to expand the gasket. This effectively seals the space between the trap and pipe. This installation of the trap can be made without destroying any portion of the pipe or of the system of which the pipe forms a part. Not only will the trap prevent the back flow of gases in a pipe, but it may also be used to prevent rats gaining passage back and forth through pipes. In addition to the ease with which the trap can be installed, another prominent advantage of the present construction is that the cross-sectional contour of the trap sections is immaterial, so far as effecting the seal between the trap and pipe is concerned.

What I claim is:

1. In a gas trap for sewer pipes, a pair of relatively movable sections adapted to be inserted in a pipe, a valve carried by one of said sections, an expansible sealing element associated with the trap sections, and means for moving said trap sections relatively to one another to expand said element against the interior of the pipe.

2. In a gas trap for sewer pipes, a pair of telescoping sections adapted to be inserted in a pipe, a valve associated therewith, and means for effecting a seal between said trap and pipe comprising an expansible element movable into contact with the pipe wall by a telescoping movement of said sections.

3. In a gas trap for pipes, the combination of a pair of telescoping sections of less cross-sectional area than the pipe in which the trap is used, a valve associated with said sections, and means for effecting a seal between said trap and the inner surface of the pipe comprising a resilient element expansible into contact with said wall by a relative movement of said sections.

4. In a gas trap for sewer pipes, a pair of telescoping sections, a valve associated with said sections, an annular expansible member between said sections, and means for moving said sections toward each other to expand said annular member.

WALTER A. WALLMAN.